United States Patent
Wang et al.

(10) Patent No.: US 9,537,131 B2
(45) Date of Patent: Jan. 3, 2017

(54) BATTERY ANODE WITH PRELOADED METALS

(71) Applicant: Sharp Laboratories of America, Inc., Camas, WA (US)

(72) Inventors: Long Wang, Vancouver, WA (US); Yuhao Lu, Vancouver, WA (US); Jong-Jan Lee, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 335 days.

(21) Appl. No.: 14/198,663

(22) Filed: Mar. 6, 2014

(65) Prior Publication Data

US 2014/0186706 A1    Jul. 3, 2014

Related U.S. Application Data (63) Continuation of application No. 14/193,782, filed on Feb. 28, 2014, which is a continuation of application
(Continued)

(51) Int. Cl.
*H01M 4/58* (2010.01)
*H01M 2/16* (2006.01)
(Continued)

(52) U.S. Cl.
CPC ............ *H01M 2/1686* (2013.01); *C01B 17/02* (2013.01); *C01B 19/02* (2013.01); *C01B 25/003* (2013.01);
(Continued)

(58) Field of Classification Search
CPC ........ H01M 1/12; H01M 4/02; H01M 4/0402; H01M 4/624; H01M 4/382; H01M 4/5835; H01M 4/58; H01B 1/128; H01B 1/124
See application file for complete search history.

(56) References Cited

U.S. PATENT DOCUMENTS

2010/0003601 A1    1/2010  Niessen et al.
2012/0028137 A1    2/2012  Chase et al.
(Continued)

FOREIGN PATENT DOCUMENTS

JP    2011-165627    8/2011
JP    2011-246303    12/2011
(Continued)

OTHER PUBLICATIONS

D.A. Stevens, J.R. Dahn, High Capacity Anode Materials for Rechargeable Sodium-ion Batteries, J. Electrochem. Soc. 147 (2000) 1271.
(Continued)

*Primary Examiner* — Emily Le
*Assistant Examiner* — Monique Wills
(74) *Attorney, Agent, or Firm* — Law Office of Gerald Maliszewski; Gerald Maliszewski (57) ABSTRACT

A method is presented for fabricating an anode preloaded with consumable metals. The method provides a material (X), which may be one of the following materials: carbon, metals able to be electrochemically alloyed with a metal (Me), intercalation oxides, electrochemically active organic compounds, and combinations of the above-listed materials. The method loads the metal (Me) into the material (X). Typically, Me is an alkali metal, alkaline earth metal, or a combination of the two. As a result, the method forms a preloaded anode comprising Me/X for use in a battery comprising a $M1_YM2_Z(CN)_N \cdot mH_2O$ cathode, where M1 and M2 are transition metals. The method loads the metal (Me) into the material (X) using physical (mechanical) mixing, a
(Continued)

chemical reaction, or an electrochemical reaction. Also provided is preloaded anode, preloaded with consumable metals.

14 Claims, 4 Drawing Sheets

Related U.S. Application Data

No. 14/193,501, filed on Feb. 28, 2014, now Pat. No. 9,406,919, which is a continuation-in-part of application No. 14/174,171, filed on Feb. 6, 2014, which is a continuation-in-part of application No. 14/067,038, filed on Oct. 30, 2013, which is a continuation-in-part of application No. 14/059,599, filed on Oct. 22, 2013, now Pat. No. 9,083,041, which is a continuation-in-part of application No. 13/907,892, filed on Jun. 1, 2013, now Pat. No. 8,968,925, which is a continuation-in-part of application No. 13/897,492, filed on May 20, 2013, now Pat. No. 9,099,719, which is a continuation-in-part of application No. 13/872,673, filed on Apr. 29, 2013, now Pat. No. 9,246,164, which is a continuation-in-part of application No. 13/752,930, filed on Jan. 29, 2013, now Pat. No. 9,099,718, which is a continuation-in-part of application No. 13/603,322, filed on Sep. 4, 2012, now Pat. No. 9,159,502, and a continuation-in-part of application No. 13/523,694, filed on Jun. 14, 2012, now Pat. No. 8,956,760, which is a continuation-in-part of application No. 13/449,195, filed on Apr. 17, 2012, which is a continuation-in-part of application No. 13/432,993, filed on Mar. 28, 2012, now Pat. No. 9,269,953.

(51) Int. Cl.

| | | |
|---|---|---|
| C01C 3/12 | (2006.01) | |
| H01M 4/136 | (2010.01) | |
| H01M 4/04 | (2006.01) | |
| H01M 4/62 | (2006.01) | |
| H02J 7/00 | (2006.01) | |
| H01M 4/134 | (2010.01) | |
| H01M 4/1395 | (2010.01) | |
| C01B 17/02 | (2006.01) | |
| C01B 19/02 | (2006.01) | |
| C01B 25/00 | (2006.01) | |
| C01B 31/00 | (2006.01) | |
| C01B 33/021 | (2006.01) | |
| C01D 1/02 | (2006.01) | |
| C01D 15/02 | (2006.01) | |
| H01M 4/131 | (2010.01) | |
| H01M 4/133 | (2010.01) | |
| H01M 4/1391 | (2010.01) | |
| H01M 4/38 | (2006.01) | |
| H01M 4/485 | (2010.01) | |
| H01M 4/505 | (2010.01) | |
| H01M 4/56 | (2006.01) | |
| H01M 4/587 | (2010.01) | |
| H01M 10/054 | (2010.01) | |
| H01M 10/0525 | (2010.01) | |
| H01M 10/0565 | (2010.01) | |
| H01M 4/1397 | (2010.01) | |
| H01M 10/052 | (2010.01) | |

(52) U.S. Cl.
CPC .............. *C01B 31/00* (2013.01); *C01B 33/021* (2013.01); *C01C 3/12* (2013.01); *C01D 1/02* (2013.01); *C01D 15/02* (2013.01); *H01M 2/1653* (2013.01); *H01M 4/04* (2013.01); *H01M 4/0404* (2013.01); *H01M 4/049* (2013.01); *H01M 4/0416* (2013.01); *H01M 4/0452* (2013.01); *H01M 4/0471* (2013.01); *H01M 4/0495* (2013.01); *H01M 4/0497* (2013.01); *H01M 4/131* (2013.01); *H01M 4/133* (2013.01); *H01M 4/134* (2013.01); *H01M 4/136* (2013.01); *H01M 4/1391* (2013.01); *H01M 4/1395* (2013.01); *H01M 4/1397* (2013.01); *H01M 4/38* (2013.01); *H01M 4/381* (2013.01); *H01M 4/382* (2013.01); *H01M 4/387* (2013.01); *H01M 4/485* (2013.01); *H01M 4/505* (2013.01); *H01M 4/56* (2013.01); *H01M 4/58* (2013.01); *H01M 4/587* (2013.01); *H01M 4/5825* (2013.01); *H01M 4/628* (2013.01); *H01M 10/054* (2013.01); *H01M 10/0525* (2013.01); *H01M 10/0565* (2013.01); *H02J 7/0042* (2013.01); *H01M 10/052* (2013.01); *Y02E 60/122* (2013.01); *Y10T 29/49108* (2015.01)

(56) References Cited

U.S. PATENT DOCUMENTS

| | | | |
|---|---|---|---|
| 2012/0129056 A1* | 5/2012 | Majima | H01M 4/04 429/339 |
| 2012/0328936 A1* | 12/2012 | Wessells | H01M 10/054 429/188 |
| 2013/0252082 A1* | 9/2013 | Thompkins | C01B 31/02 429/188 |
| 2013/0284988 A1 | 10/2013 | Satake et al. | |
| 2014/0220438 A1 | 8/2014 | Abe et al. | |

FOREIGN PATENT DOCUMENTS

| | | |
|---|---|---|
| JP | 2012-74189 | 4/2012 |
| JP | 2013-62242 | 4/2013 |
| JP | 2013-131486 | 7/2013 |
| JP | 2013-191330 | 9/2013 |
| JP | 2013-254682 | 12/2013 |
| JP | 2014-2847 | 1/2014 |
| JP | 2014-75284 | 4/2014 |
| WO | WO2014/007358 | 1/2014 |

OTHER PUBLICATIONS

Edward Buiel, J.R. Dahn, Reduction of The Irreversible Capacity in Hard-Carbon Anode Materials Prepared from Sucrose for Li-ion Batteries, J. Electrochem. Soc. 145 (1998) 1977.
D.A. Stevens, J. R. Dahn, The Mechanism of Lithium and Sodium Insertion in Carbon Materials, J. Electrochem. Soc. 148 (2001) A803.
D.A. Stevens et al., An in-situ Small-Angle X-ray Scattering Study of Sodium Insertion into a Nanoporous Carbon Anode Material within . . . , J. Electrochem. Soc. 14 (2000) 4428.
Yang Sun et al., Direct Atomic-scale Confirmation of Three-phase Storage Mechanism in Li4Ti5O12 Anodes for Room-temperature Sodium-ion Batteries, Nat. Comm. 4 (2013) 1870.
P. Senguttuvan et al., Na2Ti3O7: Lowest Voltage Ever Reported Oxide Insertion Electrode for Sodium on Batteries, Chem. Mater. 23 (2011) 4109.
M. K. Datta et al., Tin and graphite based nanocomposites: Potential anode for sodium on batteries, J. Power Scources, 225(2013) 316.
Y. Zhu et al., Electrospun Sb/C Fibers for a Stable and Fast Sodium-ion Battery Anode, ACS Nano, 7 (2013) 6378.
Y. Park et al., Sodium terephthalate as an organic anode material for sodium ion batteries, Adv. Mater., 24(2012) 3562.
A. Abouimrane et al., Sodium insertion in carboxyiate based materials and their application in 3.6 V full sodium cells, Energy Environ. Sci., 5(2012) 9632.

(56) References Cited

OTHER PUBLICATIONS

M.E. Leonova et al., High-Pressure Phase Transition of Hexagonal Alkali Pnictides, Inorg. Mater, 39 (2003) 266.

* cited by examiner

BATTERY ANODE WITH PRELOADED METALS

RELATED APPLICATIONS

This application is a Continuation-in-Part of an application entitled, METAL BATTERY ELECTRODE WITH PYROLYZED COATING, invented by Yuhao Lu et al, Ser. No. 14/193,782, filed Feb. 28, 2014;

which is a Continuation-in-Part of an application entitled, METAL HEXACYANOMETALLATE ELECTRODE WITH SHIELD STRUCTURE, invented by Yuhao Lu et al, Ser. No. 14/193,501, filed Feb. 28, 2014;

which is a Continuation-in-Part of an application entitled, CYANOMETALLATE CATHODE BATTERY AND METHOD FOR FABRICATION, invented by Yuhao Lu et al, Ser. No. 14/174,171, filed Feb. 6, 2014;

This application is a Continuation-in-Part of an application entitled, SODIUM IRON(II)-HEXACYANOFER-RATE(II) BATTERY ELECTRODE AND SYNTHESIS METHOD, invented by Yuhao Lu et al, Ser. No. 14/067,038, filed Oct. 30, 2013;

which is a Continuation-in-Part of an application entitled, TRANSITION METAL HEXACYANOMETALLATE-CONDUCTIVE POLYMER COMPOSITE, invented by Sean Vail et al., Ser. No. 14/059,599, filed Oct. 22, 2013;

which is a Continuation-in-Part of an application entitled, METAL-DOPED TRANSITION METAL HEXACYANOFERRATE (TMHCF) BATTERY ELECTRODE, invented by Yuhao Lu et al., Ser. No. 13/907,892, filed Jun. 1, 2013;

which is a Continuation-in-Part of an application entitled, HEXACYANOFERRATE BATTERY ELECTRODE MODIFIED WITH FERROCYANIDES OR FERRICYANIDES, invented by Yuhao Lu et al., Ser. No. 13/897,492, filed May 20, 2013;

which is a Continuation-in-Part of an application entitled, PROTECTED TRANSITION METAL HEXACYANOFERRATE BATTERY ELECTRODE, invented by Yuhao Lu et al., Ser. No. 13/872,673, filed Apr. 29, 2013;

which is a Continuation-in-Part of an application entitled, TRANSITION METAL HEXACYANOFERRATE BATTERY CATHODE WITH SINGLE PLATEAU CHARGE/DISCHARGE CURVE, invented by Yuhao Lu et al., Ser. No. 13/752,930, filed Jan. 29, 2013;

which is a Continuation-in-Part of an application entitled, SUPERCAPACITOR WITH HEXACYANOMETALLATE CATHODE, ACTIVATED CARBON ANODE, AND AQUEOUS ELECTROLYTE, invented by Yuhao Lu et al., Ser. No. 13/603,322, filed Sep. 4, 2012.

Ser. No. 13/752,930 is also a Continuation-in-Part of an application entitled, IMPROVEMENT OF ELECTRON TRANSPORT IN HEXACYANOMETALLATE ELECTRODE FOR ELECTROCHEMICAL APPLICATIONS, invented by Yuhao Lu et al., Ser. No. 13/523,694, filed Jun. 14, 2012;

which is a Continuation-in-Part of an application entitled, ALKALI AND ALKALINE-EARTH ION BATTERIES WITH HEXACYANOMETALLATE CATHODE AND NON-METAL ANODE, invented by Yuhao Lu et al., Ser. No. 13/449,195, filed Apr. 17, 2012;

which is a Continuation-in-Part of an application entitled, ELECTRODE FORMING PROCESS FOR METAL-ION BATTERY WITH HEXACYANOMETALLATE ELECTRODE, invented by Yuhao Lu et al., Ser. No. 13/432,993, filed Mar. 28, 2012. All these applications are incorporated herein by reference.

This invention was made with Government support under DE-AR0000297 awarded by DOE. The Government has certain rights in this invention.

BACKGROUND OF THE INVENTION

1. Field of the Invention

This invention generally relates to electrochemical cells and, more particularly, to an anode preloaded with consumable metals, and an associated fabrication process.

2. Description of the Related Art

The rechargeable lithium ion battery (LIB) has triggered the portable electronic devices revolution due to its high power density, long cycling life, and environmental compatibility. The rechargeable LIB consists of a cathode (positive electrode) and an anode (negative electrode), separated by a $Li^+$-ion permeable membrane. A solution or polymer containing lithium-ions is also used in the battery so that $Li^+$-ions can "rock" back and forth between the positive and negative electrode freely. The positive materials are typically transition-metal oxides such as lithium cobalt oxide ($LiCoO_2$), lithium manganese oxide ($LiMn_2O_4$), lithium iron phosphate ($LiFePO_4$), and their derivatives. Lithium-ions can move in their interstitial space freely and reversibly. The negative electrode materials can use lithium-metal, alloys, and carbonaceous materials. During discharge, $Li^+$-ions are extracted from the negative electrode and inserted into the positive electrode. In the meantime, electrons pass through an external circuit from the negative electrode to the positive electrode and generate electric power. During a charge, ions and electrons move along the reverse direction and go back to their original places.

Although LIBs have been successfully used, the conflict between lithium demand and its scarcity surges its cost, which hinders the further application of lithium-ion batteries on a large scale. Therefore, a low-cost rechargeable battery is urgently needed as an alternative to expensive LIBs. Under the circumstance, sodium-ion batteries are attracting more attention because sodium has very similar properties to lithium, but a cheaper cost. Like lithium-ion batteries, sodium-ion batteries need $Na^+$-host materials as their electrode. Much effort has been expended to directly duplicate the $Li^+$-host structures, using $Na^+$-host electrode materials for the sodium-ion batteries. For example, $NaCoO_2$, $NaMnO_2$, $NaCrO_2$ and $Na_{0.85}Li_{0.17}Ni_{0.21}Mn_{0.64}O_2$, all having a layered-structure similar to $LiCoO_2$, have been developed for sodium-ion batteries. Similarly, $Co_3O_4$ with a Spinel structure, $Na_3V_2(PO_4)_3$ with a NASICON structure, and $NaFePO_4$ with an Olivine structure have been employed in sodium batteries. In addition, sodium fluorophosphates, such as $Na_2PO_4F$, $NaVPO_4F$ and $Na_{1.5}VOPO_4F_{0.5}$, have also used as the positive electrode in sodium batteries.

However, it is impractical to copy the structures of $Li^+$-host compounds for $Na^+$ or $K^+$-host compounds. Sodium and potassium ions are much larger than lithium ions, and severely distort the structure of the $Li^+$-host compounds. Thus, it is very important for the advancement of sodium/potassium-ion batteries to develop new $Na^+$/$K^+$-host materials with large interstitial spaces in which sodium/potassium-ions can easily and reversibly move. $Na^+$/$K^+$-ions have been observed to intercalate into metal cyanide compounds.

Figure 1:
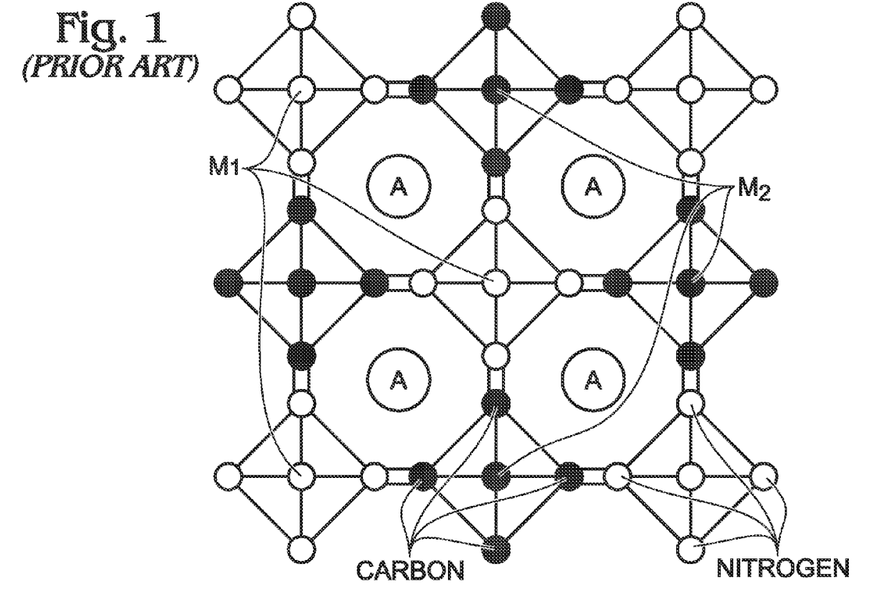
FIG. 1 is a diagram depicting the crystal structure of a metal hexacyanometallate (MHCM) (prior art).

FIG. 1 is a diagram depicting the crystal structure of a metal hexacyanometallate (MHCM) (prior art). MHCMs can be expressed as $A_XM1_YM2_Z(CN)_N \cdot MH_2O$, where A can be selected from, but not limited to alkali and alkaline metals, and M1 and M2 are transition metals such as titanium (Ti), vanadium (V), chrome (Cr), manganese (Mn), iron (Fe), cobalt (Co), nickel (Ni), copper (Cu), zinc (Zn), calcium (Ca), magnesium (Mg), etc. M1 and M2 can be the same or a different metal. The ratio (X:N) of M1 and M2 is a variable, depending on the materials used. Transition metal hexacyanoferrates (TMHCFs) with large interstitial spaces have also been investigated as cathode materials for rechargeable batteries. TMHCM can be expressed as M1$_Y$M2$_Z$(CN)$_N$·MH$_2$O.

Unlike cathode material, for which various materials are available for both LIBs and MeIBs, where Me is a metal such as Na, potassium (K), magnesium (Mg), calcium (Ca), cesium (Cs), or aluminum (Al), options for anode material are very limited, especially for MeIBs. Currently, graphite is the most widely used anode material for LIBs. Its layered structure allows lithium intercalation between carbon layers, and the reaction can be written as follows:

Such an intercalation reaction occurs below 0.2 V vs. Li$^+$/Li and has good reversibility, resulting in about 12% initial irreversible capacity in the first cycle. However, noteworthy is the fact that non-lithium Me$^{a+}$ cannot insert into graphite layers because it has a larger size than Li$^+$. As a result, alternative anode materials are highly desired in development of rechargeable MeIBs. Taking the anode materials for SIBs as an example, hard carbon or so called "non-graphitizable" carbonaceous materials is one candidate. Unlike graphite, which has poor large Me-ion (e.g. sodium) storage properties, it can sustain a capacity as high as 300 milliamp hours per gram (mAh/g), thanks to pseudo-capacitive Me-ion absorption on its surface. Dahn's group prepared various hard carbon anodes derived from different low-cost organic precursors and evaluated their anodic properties in both LIBs and SIBS [1-2]. They also revealed the sodium insertion mechanism in hard carbon anodes [3-4]. Besides an intercalation process that occurs at a high potential range, corresponding to sodium insertion into graphene layers, filling in micro-pores on hard carbon surface was found at a low-potential range close to sodium metal. These reactions are only partially reversible in the first cycle, therefore resulting in a large irreversible capacity of more than 30%. Other anode materials, such as sodium-intercalation oxides, alloys and organic compounds, have been investigated for potential applications in SIBs. Li$_4$Ti$_5$O$_{12}$, a zero-strain anode material for LIBs, was found to undergo a three-phase reaction during sodium intercalation [5]. It showed a reversible capacity of 150 mAh/g after an activation process in the first 20 cycles. Nevertheless, its initial coulombic efficiency was only 81%. Tarascon's group reported Na$_2$Ti$_3$O$_7$ as a low-voltage anode that has the lowest desodiation potential among non-carbon sodium-intercalation compounds. However, its irreversible capacity is more than 40% [6]. Metals such as tin, antimony, and lead that can form alloys with sodium have a high reversible capacity (>500 mAh/g), however, they also show an initial capacity loss around 20% in the very first cycle [7, 8]. Recently, Hong et al. and Hu et al. demonstrated a reversible Na$^+$ insertion behavior into an organic anode, Na$_2$C$_8$H$_4$O$_4$, which showed a reversible capacity of 300 mAh/g in a low voltage range [9, 10]. Like other anode materials, this organic anode shows poor reversibility in the first cycle. Aside from the use of these anode materials in SIBs, it is believed that they may also show a large irreversible capacity during the first cycle with other metal batteries because of similar electrochemical reactions. Since the irreversible reactions, i.e. solid electrolyte interface (SEI) formation, on the anode side consume metal-ions from the cathode, the result is a dramatic energy decrease in the full-battery. Therefore, the goal of reducing the irreversible capacity of these anodes becomes a major challenge in development of MeIBs.

It would be advantageous if an anode could be fabricated in a preloaded condition, so that it maintained a large reversible capacity when used in a battery.

[1] D. A. Stevens, J. R. Dahn, High Capacity Anode Materials for Rechargeable Sodium-ion Batteries, J. Electrochem, Soc. 147 (2000) 1271,

[2] Edward Buiel, J. R. Dahn, Reduction of The Irreversible Capacity in. Hard-Carbon. Anode Materials Prepared from Sucrose for Li-ion Batteries, J. Electrochem. Soc. 145 (1998) 1977.

[3] D. A. Stevens, J. R. Dahn, The Mechanism of Lithium and Sodium Insertion in Carbon. Materials, J. Electrochem. Soc. 148 (2001) A803,

[4] D. A. Stevens, J. R. Dahn. An in-situ Small-Angle X-ray Scattering Study of Sodium Insertion into A Nanoporous Carbon Anode Material within. An Operating Electrochemical Cell, J. Electrochem. Soc. 147 (2000) 4428,

[5] Yang Sun, Liang Zhao, Huilin. Pan, Xia Lu, Lin Gu, Yong-Sheng Hu, Hong Li, Michel Armand, Yuichi Ikuhara, Liquan Chen, Xuejie Huang, Direct Atomic-scale Confirmation of Three-phase Storage Mechanism in Li$_4$Ti$_5$O$_{12}$ Anodes for Room-temperature Sodium-ion Batteries, Nat. Comm. 4 (2013) 1870.

[6] P. Senguttuvan, G. Rousse, V. Seznec, J. M. Tarascon, M. R. Palacin, Na$_2$Ti$_3$O$_7$: Lowest Voltage Ever Reported. Oxide Insertion. Electrode for Sodium Ion. Batteries, Chem. Mater. 23 (2011) 4109.

[7] M. K. Datta, R. Epur, P. Saha, K. Kadakia, S. K. Park, P. N. Kumta, Tin and graphite based nanocomposites: Potential anode for sodium ion batteries, J. Power Sources, 225(2013) 316.

[8] Y. Zhu, X. Han, Y. Xu, Y. Liu, S. Zheng, K. Xu, L. Hu, C. Wang, Electrospun SbiC Fibers for a Stable and Fast Sodium-Ion Battery Anode, ACS Nano, 7 (2013) 6378.

[9] Y. Park, D. S. Shin, S. H. Woo, N. S. Choi, K. H. Shin, S. M. Oh, K. T. Lee, S. Y. Hong, Sodium terephthalate as an organic anode material for sodium ion batteries, Adv. Mater., 24(2012) 3562.

[10] A. Abouimrane, W. Weng, H. Eltayeb, Y. Cui, J. Niklas, O. Poluektov, K. Amine, Sodium insertion in carboxylate based materials and their application in 3.6 V full sodium cells, Energy Environ. Sci., 5(2012) 9632.

[11] M. E. Leonova, I. K. Bdikin, S. A. Kulinich, O. K. Gulish, L. G. Sevast'yanova, K. P. Burdina, High-Pressure Phase Transition of Hexagonal Alkali Pnictides, *Inorg. Mater,* 39 (2003) 266.

SUMMARY OF THE INVENTION

Disclosed herein is an anode material made with preloaded metals for use in high-performance metal-ion batteries (MeIBs), where Me may be a metal such as sodium (Na), potassium (K), calcium (Ca), magnesium (Mg), cesium (Cs), or aluminum (Al) for example. The metals can be physically, chemically, or electrochemically loaded into another anode active material, such as carbon, metals that can be alloyed with Me, intercalation oxides, electrochemically active organic compounds, or composites containing at least one of above. For example, preloading sodium at anode side enables the usage of non-sodium-containing cathodes and more importantly, eliminates the irreversible capacity caused by irreversible reactions take place in the early cycle stages. By analogy, the advantages of preloading sodium-ion batteries (SIBs) can be extended to other MeIBs.

The anode material contains Me, which promotes electrochemical reactions with at least one of the following non-Me-metal materials: hard carbon (or so called "non-graphitized carbon"); metal or alloys contains at least one of antimony (Sb), tin (Sn), lead (Pb), phosphorus (P), sulfur (S), silicon (Si), or selenium (Se); Me-ion intercalation compounds such as (but not limited to) $Li_4Ti_5O_{12}$, $Na_4Ti_5O_{12}$, $Na_3Ti_2O_7$, $Na_x[Li_{1-y}Ti_y]O_2$; and organic carboxylate based materials such as ($C_8H_4Na_2O_4$), ($C_8H_6O_4$), ($C_8H_5NaO_4$), ($C_8Na_2F_4O_4$), ($C_{10}H_2Na_4O_8$), ($C_{14}H_4O_6$), and ($C_{14}H_4Na_4O_8$). The preloaded Me can be accommodated by other electrochemical active non-Me-metal components acting as a host, i.e. presodiated carbon or alloys. The preloading of Me can be achieved by mechanically embedding Me particles into other anode components. The process can involve both dry and wet processing techniques such as electrostatic assisted spray, hot spray, mechanical mixing, and various printing methods. Further, the metal Me can be chemically preloaded by reacting with a Me-containing reducing agent or by electrochemical reactions.

Accordingly, a method is presented for fabricating an anode preloaded with consumable metals. The method provides a material (X), which may be one of the following materials: carbon, metals able to be electrochemically alloyed with a metal (Me), intercalation oxides, electrochemically active organic compounds, and combinations of the above-listed materials. The method loads the metal (Me) into the material (X). Typically, Me is typically an alkali metal, alkaline earth metal, or a combination of the two. More explicitly, Me may be lithium (Li), sodium (Na), potassium (K), rubidium (Rb), cesium (Cs), calcium (Ca), terbium (Tb), strontium (Sr), barium (Ba), silver (Ag), aluminum (Al), or magnesium (Mg). As a result, the method forms a preloaded anode comprising Me/X for use in a battery comprising a $M1_YM2_Z(CN)_N \cdot MH_2O$ cathode;

where M1 and M2 are transition metals;
where Y is less than or equal to 1;
where Z is less than or equal to 1;
where N is less than or equal to 6; and,
where M is less than or equal to 20.

As noted above, the method loads the metal (Me) into the material (X) includes using physical (mechanical) mixing, a chemical reaction, or an electrochemical reaction. M1 and M2 are each an independently derived (need not be the same) transition metal such as titanium (Ti), vanadium (V), chromium (Cr), manganese (Mn), iron (Fe), cobalt (Co), nickel (Ni), copper (Cu), zinc (Zn), Ca, or Mg.

Also provided is preloaded anode, preloaded with consumable metals. The preloaded anode is formed from a conductive current collector with Me/X overlying the current collector, where the Me and X materials are as described above. Additionally provided is a preloaded battery with an anode preloaded with consumable metals. The battery is made from an electrolyte, the above-described preloaded anode, a cathode made from a conductive current collector with $M1_YM2_Z(CN)_N \cdot MH_2O$ overlying the current collector, and an ion-permeable membrane immersed in the electrolyte, interposed between the anode and the cathode.

Additional details of the above-described method, preloaded anode, and preloaded battery are presented below.

DETAILED DESCRIPTION

Figure 2:
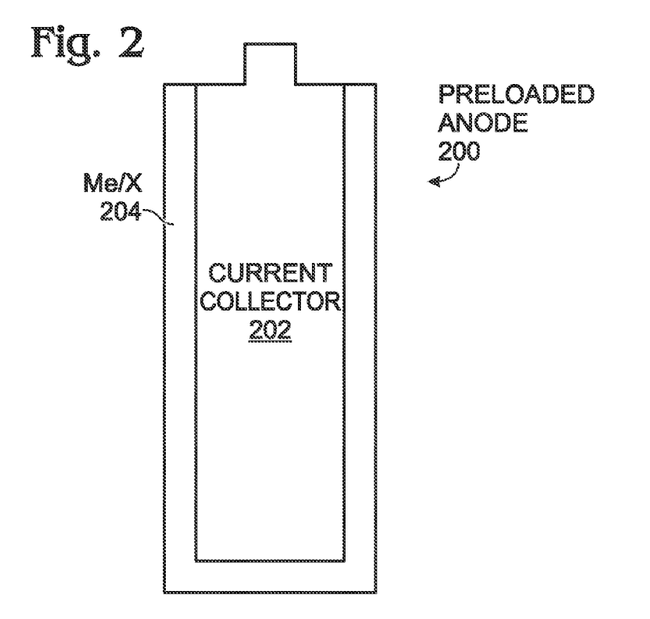
FIG. 2 is a partial cross-sectional view of a preloaded anode, which is preloaded with consumable metals.

FIG. 2 is a partial cross-sectional view of a preloaded anode, which is preloaded with consumable metals. The preloaded anode 200 comprises a conductive current collector 202 and Me/X 204 overlying the current collector 202. X is a material such as carbon, metals able to be electrochemically alloyed with a metal (Me), intercalation oxides, electrochemically active organic compounds, and combinations of the above-listed materials. Me is a metal, typically an alkali metal, alkaline earth metal, or a combination of the two. More explicitly, Me may be lithium (Li), sodium (Na), potassium (K), rubidium (Rh), cesium (Cs), calcium (Ca), terbium (Tb), strontium (Sr), barium (Ba), silver (Ag), aluminum (Al), magnesium (Mg), or combinations of these metals.

Some explicit examples of Me/X materials include $Li_RVO_2$, where $0<R<1$; $Na_sMnO_2$, where $0<s<1$; a Na—Sn alloy; a mixture of lithium powder and tin particles; a mixture of sodium particles and hard carbon powder; a compound of hard carbon and lithium; a compound of hard carbon and sodium; a Li—Sn alloy; a Li—Sb alloy; a Na—Sb alloy; a compound of $Fe_3O_4$ and Li; and, a compound of $Fe_3O_4$ and Na. However, it should be understood that this is just a small list of possible materials.

Figure 3:
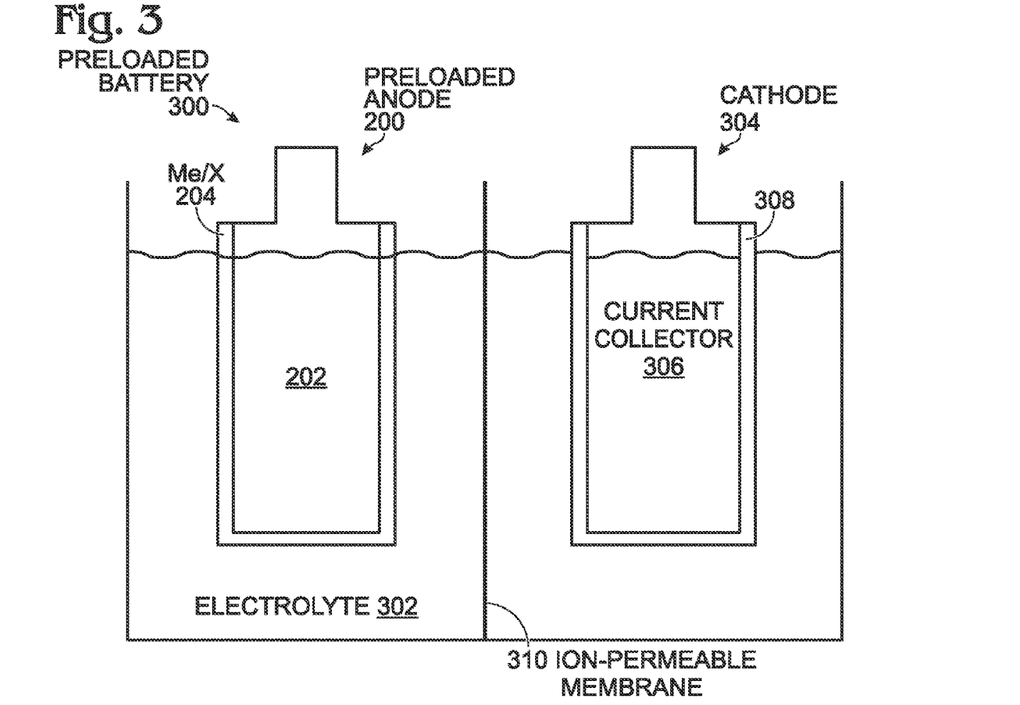
FIG. 3 is a partial cross-sectional view of a preloaded battery, with an anode preloaded with consumable metals.

FIG. 3 is a partial cross-sectional view of a preloaded battery, with an anode preloaded with consumable metals. The preloaded battery 300 comprises an electrolyte 302 and a preloaded anode 200, as described above in the explanation of FIG. 2. Details of the preloaded anode are not repeated here in the interest of brevity. The preloaded battery 300 further comprises a cathode 304 made from a conductive current collector 306 and $M1_YM2_Z(CN)_N \cdot MH_2O$ 308 overlying the current collector;

where M1 and M2 are transition metals;
where X is less than or equal to 2;
where Y is less than or equal to 1;
where z is less than or equal to 1;
where N is less than or equal to 6; and,
where M is less than or equal to 20.

An ion-permeable membrane 310 is immersed in the electrolyte 302, interposed between the anode 200 and the cathode 304. As explained above, M1 and M2 are each independently derived, and may be Ti, V, Cr, Mn, Fe, Co, Ni, Cu, Zn, Ca, or Mg.

A polymeric binder (not shown), such as polytetrafluoroethylene (PTFE) or poly-vinylidene difluoride (PVDF), may be used to provide adhesion between electrode materials and the current collectors to improve the overall physical stability.

The electrolyte 302 may be non-aqueous, such as an organic liquid electrolyte, or alternatively, gel electrolyte, polymer electrolyte, solid (inorganic) electrolyte, etc. Common examples of non-aqueous (liquid) electrolytes include organic carbonates such as ethylene carbonate (EC), propylene carbonate (PC), diethyl carbonate (DEC), etc., although many other organic carbonates and alternatives to organic carbonates exist. Typically, gel electrolytes consist of polymeric materials which have been swelled in the presence of liquid electrolytes. Examples of polymers employed as gel electrolytes include, but are not limited to, poly(ethylene)oxide (PEO) and fluorinated polymers such as poly(vinylidene) fluoride (PVDF)-based polymers and copolymers, etc. in contrast, (solid) polymer electrolytes may be prepared using the same classes of polymers for forming gel electrolytes although swelling of the polymer in liquid electrolytes is excluded. Finally, solid inorganic (or ceramic) materials may be considered as electrolytes, which may be employed in combination with liquid electrolytes. Overall, the appropriate electrolyte system may consist of combinations (hybrid) of the above classes of materials in a variety of configurations. In some instances not shown, the ion-permeable membrane 310 and the electrolyte 302 can be the same material, as may be the case for polymer gel, polymer, and solid electrolytes.

Generally, the composite anode (negative electrode) material includes preloaded Me and non-Me-metal (X) anode materials for metal-ion batteries (MeIBs), where Me may, for example, be Na, K, Ca, Cs, Mg, or Al. The composite contains preloaded Me that can be extracted from the host non-Me-metal component X during the discharge (deintercalation) process in a MeIB, thus eliminating the initial irreversible capacity introduced by a conventional non-Me-metal anode, and enabling the use of non-Me-containing cathode materials.

Although Me metal anodes have the highest theoretical capacity and provide the highest energy density in a metal-ion battery because of their low anodic potential, as compared to non-metal anode materials, it is impractical to use sodium or potassium metals in a commercial battery due to safety issues such as dendrite growth during cycling and the high chemical reactivity. Therefore, non-metal materials are considered to be the best choice for anodes in metal-ion batteries. However, as in sodium-ion batteries, all conventional non-metal anodes, as mentioned above in the Background Section, have large irreversible capacities as a result of their initial charge/discharge process. Briefly, this problem is solved by preloading electrochemically active Me into a non-Me-metal (X) anode material, which can be written as Me/X, where X can be one of the aforementioned non-Me-metal anode materials or their combinations. When the Me metal is preloaded, it is consumed by side reactions like solid electrolyte interface (SEI) formation or integrated with non-Me-metal anodes by intercalation. Therefore, no Me-metal remains permanently present in the anode after some initial charge cycling.

Figure 4:
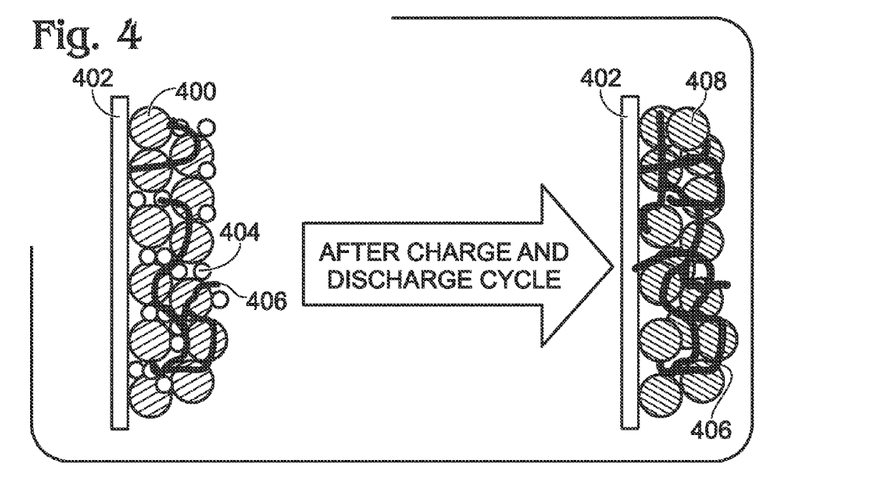
FIG. 4 is a partial cross-sectional view depicting the preloading of Me metal in the form of integrated particles.

FIG. 4 is a partial cross-sectional view depicting the preloading of Me metal in the form of integrated particles. Non-Me-metal anode material 400 overlies current collector 402 with preloaded Me-containing particles 404. A binder and conductive additives 406 may also be present. After charge cycling, Me/X material 408 is formed, where the Me metal is uniformly integrated into the non-Me-metal anode.

Figure 5:
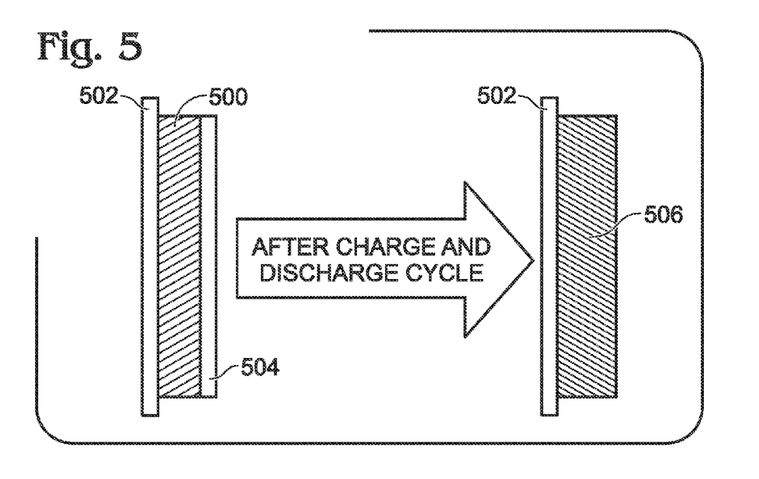
FIG. 5 is a partial cross-sectional view depicting the preloading of Me metal in the form of a metal film layer.

FIG. 5 is a partial cross-sectional view depicting the preloading of Me metal in the form of a metal film layer. A non-Me-metal layer 500 overlies current collector 502. A preloaded Me layer 504 overlies the non-Me-metal layer 500. After charge cycling, Me/X material 506 is formed, where the Me metal is uniformly integrated into the non-Me-metal anode.

Me/X can be prepared by mixing Me with X, by reducing X with Me-containing reductive agents, or by an electrochemical reaction process. For example, a Na/hard carbon composite can be prepared by integrating sodium particles into a hard carbon matrix, or the electrochemical insertion of sodium into hard carbon in a non-aqueous electrolyte contains sodium salt. In one aspect, a Na/Sb) composite can be prepared by mechanically mixing sodium and Sb particles. In another aspect, a $Na_xSb$ alloy is formed at elevated temperature in an inert atmosphere.

Two examples are presented below of battery applications based on sodium-ion batteries that comprise a Na/X anode with different cathodes as a means of illustrating the preloaded anode.

Figure 6:
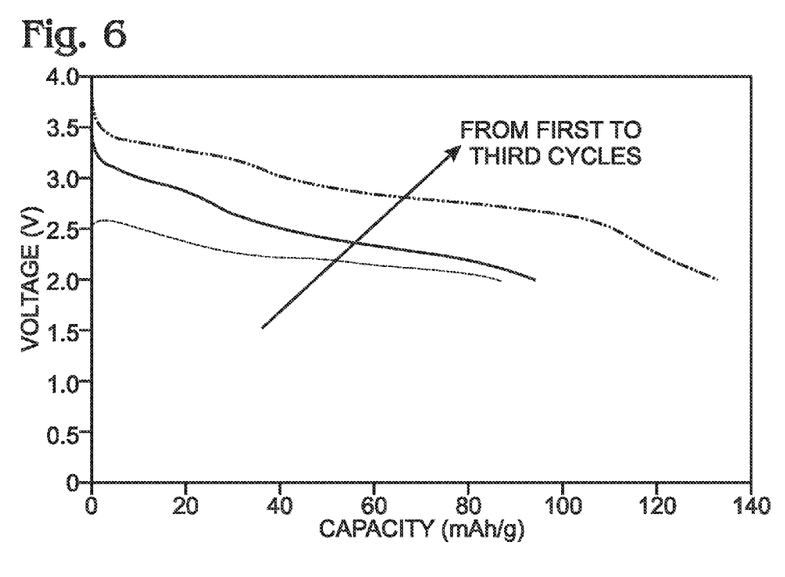
FIG. 6 is a graph depicting voltage vs. capacity for a sodium-ion battery comprising a hard carbon anode mixed with sodium metal and a Berlin green cathode ($FeFe(CN)_6$).

FIG. 6 is a graph depicting voltage vs. capacity for a sodium-ion battery comprising a hard carbon anode mixed with sodium metal and a Berlin green cathode ($FeFe(CN)_6$). The preloaded sodium metal at anode side serves as an anode during the first discharge, and intercalates into Berlin green cathode. In the subsequent charge process, sodium is removed from Berlin green and inserted into hard carbon. After three cycles, the preloaded sodium has been completely consumed and a Berlin green/hard carbon sodium battery with capacity more than 130 mAh/g is obtained based on the cathode mass, as shown in the figure. It is noteworthy that the same battery behavior can be achieved using other sodium loading methods like the electrochemical insertion of sodium into hard carbon.

Figure 7:
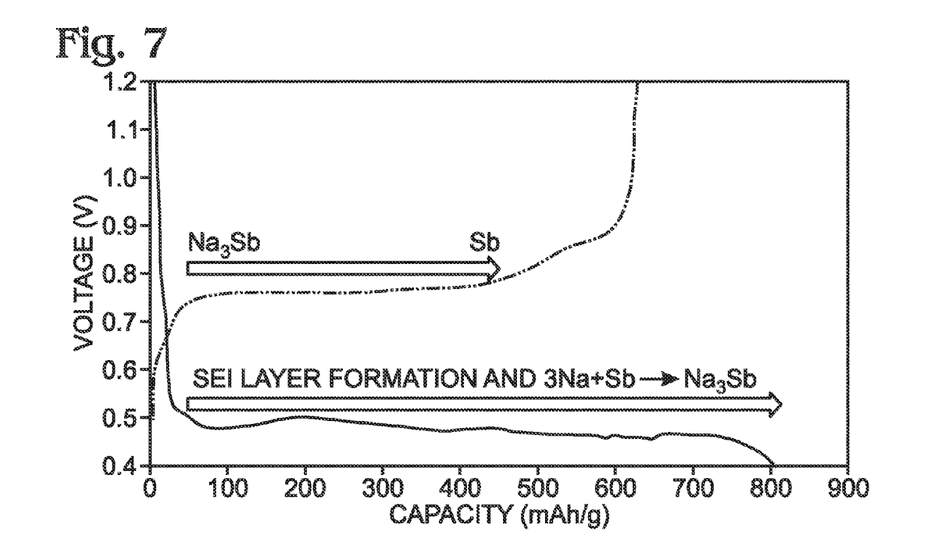
FIG. 7 is a graph depicting voltage vs. capacity for a half-cell using a sodium anode and an antimony cathode.

FIG. 7 is a graph depicting voltage vs. capacity for a half-cell using a sodium anode and an antimony cathode. In the first cycle of the battery, Sb undergoes an alloying reaction during discharge, and $Na_3Sb$ is formed at the end of the discharge. Although a high capacity of more than 800 mAh/g is delivered, the reversible capacity is only 600 mAh/g, corresponding to 75% of the initial discharge capacity. The large irreversible capacity is ascribed to the SEI layer formation, which means that the electrolyte is electrochemically reduced on the surface of anode. To resolve this problem a preloaded anode of $Na_3Sb$ alloy can be obtained by heating sodium and antimony at 850° C. in an Ar atmosphere [11], and the preloaded sodium in $Na_3Sb$ enables SEI layers to form once the electrolyte contacts the $Na_3Sb$. Therefore, the large irreversible capacity shown in the figure can be eliminated.

Thus, anodes made from preloaded Me and a non-Me-metal active material eliminate the irreversible capacity associated with conventional anode materials and enable the usage of non-Me containing cathode materials. As a result, high capacity and long cycle life can be obtained for safe rechargeable Me-ion batteries.

Figure 8:
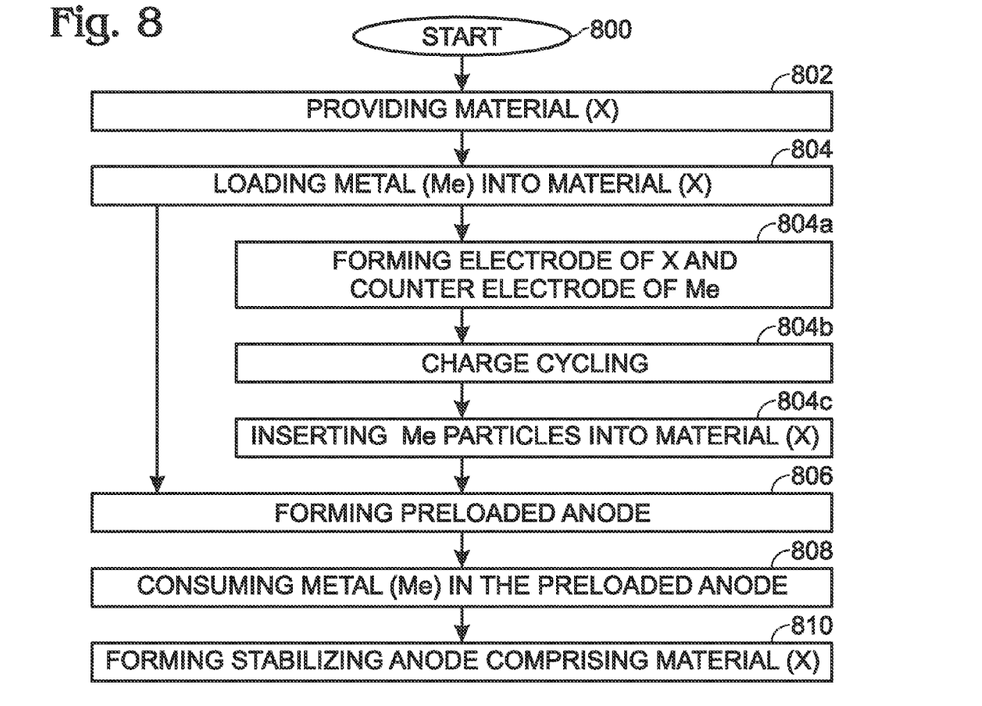
FIG. 8 is a flowchart illustrating a method for fabricating an anode preloaded with consumable metals.

FIG. 8 is a flowchart illustrating a method for fabricating an anode preloaded with consumable metals. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the method follows the numeric order of the depicted steps. The method starts at Step 800.

Step 802 provides a material (X) that may be carbon, metals able to be electrochemically alloyed with a metal (Me), otherwise referred to as non-Me-metals, intercalation oxides, electrochemically active organic compounds, or combinations of the above-listed materials. Some explicit examples include metal or alloys that contain at least one of Sb, Sn, Pb, P, S, Si, or Se. Me-ion intercalation compounds such as (but not limited to) $Li_4Ti_5O_{12}$, $Na_4Ti_5O_{12}$, $Na_3Ti_2O_7$, $Na_x[Li_{1-y}Ti_y]O_2$; and organic carboxylate based materials such as $(C_8H_4Na_2O_4)$, $(C_8H_6O_4)$, $(C_8H_5NaO_4)$, $(C_8Na_2F_4O_4)$, $(C_{10}H_2Na_4O_8)$, $(C_{14}H_4O_6)$, and $(C_{14}H_4Na_4O_8)$. Step 804 loads the metal (Me) into the material (X). Generally, Me is an alkali metal, alkaline earth metal, or a combination of the two. More explicitly, Me may be lithium (Li), sodium (Na), potassium (K), rubidium (Rh), cesium (Cs), calcium (Ca), terbium (Tb), strontium (Sr), barium (Ba), silver (Ag), aluminum (Al), or magnesium (Mg).

Step 806 forms a preloaded anode comprising Me/X for use in a battery comprising a $M1_YM2_Z(CN)_N \cdot MH_2O$ cathode;
where M1 and M2 are transition metals;
where Y is less than or equal to 1;
where Z is less than or equal to 1;
where N is less than or equal to 6; and,
where M is less than or equal to 20.

Typically, M1 and M2 are each independently derived, meaning they may be the same or different metals. Some examples of M1 and M2 metals include titanium (Ti), vanadium (V), chromium (Cr), manganese (Mn), iron (Fe), cobalt (Co), nickel (Ni), copper (Cu), zinc (Zn), Ca, and Mg.

In one aspect, Step 808 consumes the metal (Me) in the preloaded anode, and Step 810 forms a stabilized anode comprising the material (X). In one aspect, the active material in the anode is exclusively comprised of the X material.

Step 804 loads the metal (Me) into the material (X) using a physical (mechanical) mixing, chemical reaction, or electrochemical reaction process. Step 804 may load the metal (Me) into the material (X) using a chemical reaction by reducing X with Me-containing reductive agents. Then, forming the preloaded anode in Step 806 includes forming a Me/X (MeX) compound where Me is chemically reacted with X. Some examples of reducing X with Me-containing reductive agents include the following:

reducing $VO_2$ with n-butyl lithium to form $Li_RVO_2$, where $0<R<1$;
reducing $MnO_2$ with tert-butyl alkoxide-activated NaH in tetrahydrofuran to form $Na_sMnO_2$, where $0<s<1$;
reducing $TiO_2$ with NaH to form $NaTiO_2$; and,
mixing Sn particles in melted Na to form a Na—Sn alloy.

These examples are not a complete list of reduction processes and materials.

In another aspect, Step 804 loads the metal (Me) into the material (X) using physical mixing by mechanically mixing Me and X particles in an inert atmosphere, without creating a chemical reaction between the Me and X particles. Some examples of mechanically mixing Me and X particles include:

mixing a lithium powder with tin particles in an atmosphere of Ar by ball-milling; and,
mixing sodium particles with hard carbon powders in an industrial blender at a temperature above 100 degrees C., and subsequently cooling to room temperature. The physical mixing process may employ both dry and wet processing techniques such as electrostatic assisted spray, hot spray, mechanical mixing, and various printing methods. Other unnamed mixing processes and materials can also be used.

In one aspect, Step 804 loads the metal (Me) into the material (X) by an electrochemical reaction using the following substeps. Step 804a forms an electrode of X and a counter electrode of Me, both inserted into an electrolyte. For example, X may be hard carbon, tin, antimony, $Na_2Ti_3O_7$, $Li_4Ti_5O_{12}$, or $Fe_3O_4$, and Me may be lithium or sodium.

Step 804b performs a plurality of charge and discharge operations, where the charge operation uses an external current source to create a positive voltage potential from the electrode to the counter electrode. A discharge operation connects an external load between the electrode and counter electrode. In response to the charge and discharge operations, Step 804c inserts Me particles into the material (X). Then, forming the preloaded anode in Step 806 includes forming a Me/X (MeX) compound, where Me is chemically reacted with X.

In another aspect. Step 804 loads the metal (Me) into the material (X) using an electrochemical reaction by directly contacting Me and X in a Me-ion conductive solution. Again, the preloaded anode formed in Step 806 includes a Me/X (MeX) compound, where Me is chemically reacted with X.

A preloaded battery, preloaded anode, and associated fabrication processes have been provided. Examples of particular materials and process steps have been presented to illustrate the invention. However, the invention is not limited to merely these examples. Other variations and embodiments of the invention, will occur to those skilled in the art.

We claim:

1. A method for fabricating an anode preloaded with consumable metals, the method comprising:
   providing a material (X) selected from the group consisting of carbon, metals able to be electrochemically alloyed with a metal (Me), intercalation oxides, electrochemically active organic compounds, and combinations of the above-listed materials;
   loading the metal (Me) into the material (X), where Me is selected from the group consisting of alkali metals, alkaline earth metals, terbium (Tb), silver (Ag), aluminum (Al) and combinations thereof;
   forming a preloaded anode comprising Me/X for use in a battery comprising a $M1_YM2_Z(CN)_N \cdot MH_2O$ cathode;
   where M1 and M2 are independently selected from the group consisting of transition metals, calcium (Ca) and magnesium (Mg);
   where Y is less than or equal to 1;
   where Z is less than or equal to 1;
   where N is less than or equal to 6;
   where M is less than or equal to 20;
   wherein loading the metal (Me) into the material (X) includes using an electrochemical reaction as follows:
   forming an electrode of X and a counter electrode of Me, both inserted into an electrolyte;
   performing a plurality of charge and discharge operations, where the charge operation uses an external current source to create a positive voltage potential from the electrode to the counter electrode, and where the discharge operation connects an external load between the electrode and counter electrode;
   in response to the charge and discharge operations, inserting Me particles into the material (X); and,
   wherein forming the preloaded anode includes forming a Me/X compound, where Me is chemically reacted with X.

2. The method of claim 1 further comprising:
   consuming the metal (Me) in the preloaded anode; and,
   forming a stabilized anode comprising the material (X).

3. The method of claim 1 wherein forming the electrode of X includes X being selected from the group of hard carbon, tin, antimony, $Na_2Ti_3O_7$, $Li_4Ti_5O_{12}$, and $Fe_3O_4$; and, wherein forming the counter electrode of Me includes Me being selected from the group consisting of lithium and sodium.

4. The method of claim 1 wherein Me is selected from the group consisting of lithium (Li), sodium (Na), potassium (K), rubidium (Rb), cesium (Cs), calcium (Ca), strontium (Sr), barium (Ba), and magnesium (Mg).

5. The method of claim 1 wherein M1 and M2 are each independently selected from the group consisting of titanium (Ti), vanadium (V), chromium (Cr), manganese (Mn), iron (Fe), cobalt (Co), nickel (Ni), copper (Cu), zinc (Zn).

6. A preloaded battery with an anode preloaded with consumable metals, the preloaded battery comprising:
a non-aqueous electrolyte;
a preloaded anode comprising:
  a conductive current collector;
  Me/X overlying the current collector, where X is a material selected from the group consisting of carbon, metals able to be electrochemically alloy with metal (Me), intercalation oxides, electrochemically active organic compounds, and combinations of the above-listed materials, and Me is a metal is selected from the group consisting of alkali metals, alkaline earth metals, terbium (Tb), silver (Ag), aluminum (Al) and combinations thereof;
a cathode comprising:
  a conductive current collector;
  $M1_YM2_Z(CN)_N \cdot MH_2O$ overlying the current collector;
  where M1 and M2 are independently selected from the group consisting of transition metals, calcium (Ca) and magnesium (Mg);
  where X is less than or equal to 2;
  where Y is less than or equal to 1;
  where Z is less than or equal to 1;
  where N is less than or equal to 6;
  where M is less than or equal to 20; and,
an ion-permeable membrane immersed in the non-aqueous electrolyte, interposed between the anode and the cathode.

7. The preloaded battery of claim 6 wherein Me is selected from the group consisting of lithium (Li), sodium (Na), potassium (K), rubidium (Rb), cesium (Cs), calcium (Ca), strontium (Sr), barium (Ba), and magnesium (Mg).

8. The preloaded battery of claim 6 wherein Me/X is selected from the group consisting of:
$Li_RVO_2$, where $0<R<1$;
$Na_sMnO_2$, where $0<s<1$;
a Na—Sn alloy;
a mixture of lithium powder and tin particles;
a mixture of sodium particles and hard carbon powder;
a compound of hard carbon and lithium;
a compound of hard carbon and sodium;
a Li—Sn alloy;
a Li—Sb alloy;
a Na—Sb alloy;
a compound of $Fe_3O_4$ and Li; and,
a compound of $Fe_3O_4$ and Na.

9. The preloaded battery of claim 6 wherein M1 and M2 are each independently derived, as selected from the group consisting of titanium (Ti), vanadium (V), chromium (Cr), manganese (Mn), iron (Fe), cobalt (Co), nickel (Ni), copper (Cu), zinc (Zn).

10. A method for fabricating an anode preloaded with consumable metals, the method comprising:
providing a material (X) selected from the group consisting of carbon, metals able to be electrochemically alloyed with a metal (Me), intercalation oxides, electrochemically active organic compounds, and combinations of the above-listed materials;
loading the metal (Me) into the material (X), where Me is selected from the group consisting of alkali metals, alkaline earth metals, and a combination of alkali and alkaline earth metals;
forming a preloaded anode comprising Me/X for use in a battery comprising a $M1_YM2_Z(CN)_N \cdot MH_2O$ cathode;
  where M1 and M2 are independently selected from the group consisting of transition metals, calcium, and magnesium;
  where Y is less than or equal to 1;
  where Z is less than or equal to 1;
  where N is less than or equal to 6;
  where M is less than or equal to 20;
wherein loading the metal (Me) into the material (X) includes using a chemical reaction that reduces X with Me-containing reductive agents; and,
wherein forming the preloaded anode includes forming a Me/X compound where Me is chemically reacted with X.

11. The method of claim 10 wherein reducing X with Me-containing reductive agents includes a process selected from the group consisting of:
reducing $VO_2$ with n-butyl lithium to form $Li_RVO_2$, where $0<R<1$;
reducing $MnO_2$ with tert-butyl alkoxide-activated NaH in tetrahydrofuran to form $Na_sMnO_2$, where $0<s<1$;
reducing $TiO_2$ with NaH to form $NaTiO_2$; and,
mixing Sn particles in melted Na to form a Na—Sn alloy.

12. A method for fabricating an anode preloaded with consumable metals, the method comprising:
providing a material (X) selected from the group consisting of carbon, metals able to be electrochemically alloyed with a metal (Me), intercalation oxides, electrochemically active organic compounds, and combinations of the above-listed materials;
loading the metal (Me) into the material (X), where Me is selected from the group consisting of alkali metals, alkaline earth metals, and a combination of alkali and alkaline earth metals;
forming a preloaded anode comprising Me/X for use in a battery comprising a $M1_YM2_Z(CN)_N \cdot MH_2O$ cathode;
  where M1 and M2 are independently selected from the group consisting of transition metals, calcium, and magnesium;
  where Y is less than or equal to 1:
  where Z is less than or equal to 1;
  where N is less than or equal to 6;
  where M is less than or equal to 20;
wherein loading the metal (Me) into the material (X) includes mechanically mixing Me and X particles in an inert atmosphere, without creating a chemical reaction between the Me and X particles.

13. The method of claim 12 wherein mechanically mixing Me and X particles includes a process selected from the group consisting of mixing a lithium powder with tin particles in an atmosphere of Ar by ball-milling, and mixing sodium particles with hard carbon powders in an industrial blender at a temperature above 100 degrees C. and subsequently cooling to room temperature.

14. A method for fabricating an anode preloaded with consumable metals, the method comprising:
providing a material (X) selected from the group consisting of carbon, metals able to be electrochemically alloyed with a metal (Me), intercalation oxides, electrochemically active organic compounds, and combinations of the above-listed materials;

loading the metal (Me) into the material (X), where Me is selected from the group consisting of alkali metals, alkaline earth metals, and a combination of alkali and alkaline earth metals;

forming a preloaded anode comprising Me/X for use in a battery comprising a $M1_YM2_Z(CN)_N \cdot MH_2O$ cathode;

where M1 and M2 are independently selected from the group consisting of transition metals, calcium, and magnesium;

where Y is less than or equal to 1;
where Z is less than or equal to 1:
where N is less than or equal to 6;
where M is less than or equal to 20;

wherein loading the metal (Me) into the material (X) includes using an electrochemical reaction that directly contacts Me and X in a Me-ion conductive solution; and, wherein forming the preloaded anode includes forming a Me/X compound, where Me is chemically reacted with X.

* * * * *

UNITED STATES PATENT AND TRADEMARK OFFICE
CERTIFICATE OF CORRECTION

PATENT NO. : 9,537,131 B2
APPLICATION NO. : 14/198663
DATED : January 3, 2017
INVENTOR(S) : Long Wang, Yuhao Lu and Jong-Jan Lee It is certified that error appears in the above-identified patent and that said Letters Patent is hereby corrected as shown below:

On the Title Page

Item (63) in the RELATED U.S. APPLICATION DATA and continuing to the second page is listed as:
a Continuation of Serial No. 14/193,782
Should read:
a Continuation-in-part of Serial No. 14/193,782.

AND

Serial No. 14/193,782 is listed as:
a Continuation of 14/193,501
Should read:
a Continuation-in-part of 14/193,501.

Signed and Sealed this
Third Day of April, 2018

Andrei Iancu
*Director of the United States Patent and Trademark Office*